United States Patent [19]

Hoffman et al.

[11] 4,353,290

[45] Oct. 12, 1982

[54] PNEUMATIC CONTROL VALVE AND CIRCUIT

[75] Inventors: Robert K. Hoffman; Mark A. Kavanaugh, both of Plainwell, Mich.

[73] Assignee: Parker-Hannifin Corporation, Cleveland, Ohio

[21] Appl. No.: 97,261

[22] Filed: Nov. 26, 1979

[51] Int. Cl.³ ............................................. F15B 13/042
[52] U.S. Cl. ........................................ 91/461; 91/465; 137/596.15; 137/625.6
[58] Field of Search ................................ 91/461, 465; 137/596.15, 625.6

[56] References Cited

U.S. PATENT DOCUMENTS

| Re. 26,245 | 8/1967 | Henderson . | |
|---|---|---|---|
| 2,611,391 | 9/1952 | Sainsbury et al. | 137/596.15 |
| 3,011,519 | 12/1961 | Brinkel et al. | 137/596.15 X |
| 3,858,606 | 1/1975 | Cameron | 137/596.16 |
| 3,865,140 | 2/1975 | Greenwood | 137/625.64 |
| 4,269,224 | 5/1981 | Dotti et al. | 137/596.15 |

Primary Examiner—Gerald A. Michalsky
Attorney, Agent, or Firm—James A. Baker

[57] ABSTRACT

A pneumatic circuit includes a source of fluid pressure 11, a selector valve 12, a control valve 14, and a power cylinder 15. The control valve 14 includes main valves 35 and 45 and a pilot interlock valve 27. The main valves 35 and 45 include a main inlet port 36, a main exhaust port 38, and cylinder ports 37 and 47. The pilot interlock valve 27 includes a pilot inlet port 28, an interlock port 30, and a signal port 29 which communicates with signal chambers 39 and 49. The control valve 14 is mounted on a motor vehicle transmission, and a mechanical actuator 16 moves between an extended position when the transmission is out of the neutral position and a retracted position when the transmission is in the neutral position. When the actuator 16 is in the extended position, the pilot interlock valve 27 is retained in an interlocked position to maintain the pressure condition existing in the signal chambers 39 and 49. When the actuator 16 is retracted, the pilot interlock valve 27 can move to an actuating position in which the pressure condition in the signal chambers 39 and 49 can be changed by operation of the selector valve 12 to shift the cylinder 15.

11 Claims, 1 Drawing Figure

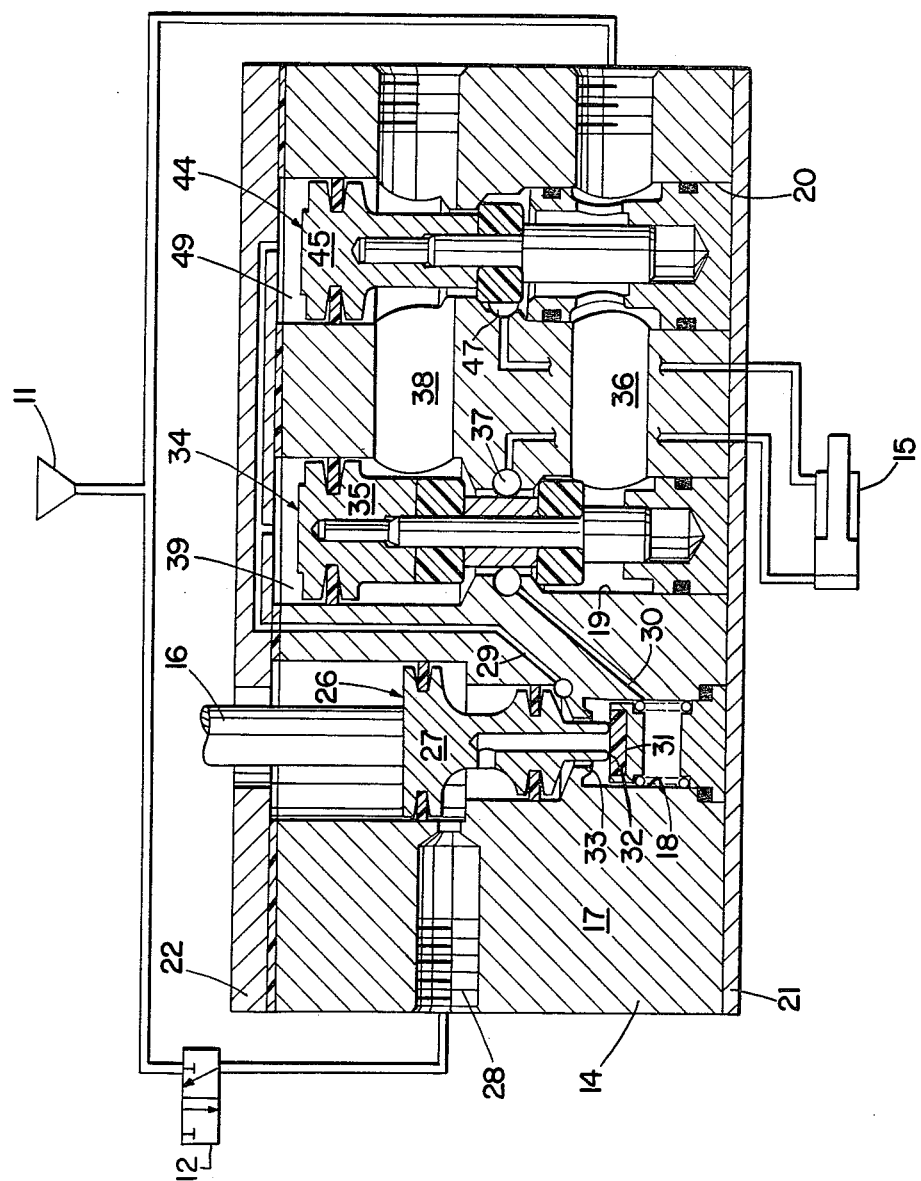

PNEUMATIC CONTROL VALVE AND CIRCUIT

BACKGROUND OF THE INVENTION

The present invention relates to a pneumatic control valve and circuit for supplying air pressure to a pneumatic cylinder in a truck transmission.

Transmissions for large over-the-road trucks frequently have 12 to 16 different gear ratios. In such transmissions, a pneumatic cylinder called a "range cylinder" is frequently used to move a rack to change the transmission from a low range of gear ratios to a high range of gear ratios. The rack is designed to be moved only when the transmission is in the neutral position, and a pneumatic control valve is provided to prevent movement of the range cylinder and rack when the transmission is not in the neutral position. Prior to applicant's invention, this pneumatic control valve was a spool valve of the type shown in U.S. Pat. No. 26,245, wherein movement of the spool valve is prevented by a mechanical transmission pin when the transmission is not in the neutral position.

SUMMARY OF THE INVENTION

The present invention departs from the prior art by providing a transmission range cylinder control valve which includes a main valve and a pilot interlock valve.

The main valve includes a main inlet port, an exhaust port, cylinder ports, and a main poppet. The main poppet is exposed to pressure in a signal chamber for moving the main poppet to open and close communication between the main valve ports.

The pilot interlock valve includes a pilot inlet port, an interlock port, and a signal port communicating with the main valve signal chamber. A pilot poppet controls communication between the pilot valve ports.

When the truck transmission is not in the neutral position, a mechanical actuator holds the pilot poppet in an interlock position. In this interlock position, communication between the pilot inlet port and the signal port is blocked so that pressure changes in the pilot inlet port cannot be communicated to the main valve signal chamber. Additionally, the interlock port is communicated with the signal port to lock the existing pressure signal in the signal chamber and prevent movement of the main valve poppet. This prevents shifting of the range cylinder in the truck transmission when the truck transmission is not in the neutral position.

When the truck transmission is in the neutral position, the pilot poppet can move to an actuating position. In the actuating position, communication between the pilot inlet port and the main valve signal chamber is opened so that pressure changes in the pilot inlet port are communicated to the main valve signal chamber to cause movement of the main valve poppet. This results in shifting of the range cylinder in the truck transmission when the truck transmission is in the neutral position.

BRIEF DESCRIPTION OF THE DRAWING

These and other aspects and advantages of the invention are incorporated in the preferred embodiment of the invention shown in the accompanying drawing, which illustrates the control circuit according to the principles of the invention with the control valve shown in a cross-sectional side-elevational view.

DETAILED DESCRIPTION OF THE DRAWING

Referring now to the drawing in greater detail, a pneumatic circuit includes a source of air pressure 11, a selector valve 12, a control valve 14, and a power cylinder 15.

The circuit shown in the drawing is disposed in a large over-the-road truck, and the source of air pressure 11 is an accumulator or other appropriate air pressure source on the truck. The selector valve 12 is mounted on the gear shift lever of the truck, and the pneumatic power cylinder 15 is operably connected to shift the transmission of the truck between a high range and a low range in a well-known manner.

The control valve 14 is mounted on the transmission of the truck and controls the supply of air to the cylinder 15 in response to an air pressure signal from the selector valve 12 and in response to a mechanical signal provided by a probe or pin 16 on the transmission of the truck. The control valve 14 includes an extruded aluminum housing 17 having transverse bores 18, 19 and 20. Steel end plates 21 and 22 are secured to the housing 17 to cover the ends of the bores 18, 19 and 20, and a suitable elastomeric seal is provided between the housing 17 and the end plate 22.

The control valve 14 includes a pilot interlock valve 26. The pilot interlock valve 26 includes an aluminum spool 27 slidably disposed in a stepped portion of the bore 18. A pilot inlet port 28 and a signal port 29 and an interlock port 30 open into the bore 18, and the spool 27 moves toward and away from a spring biased seat 31 to control communication between the inlet port 28 and the signal port 29 and the interlock port 30. The seat 31 cooperates with an annular valving surface 32 on the spool 27 and with an annular valving surface 33 on the housing 17 for this purpose.

The control valve 14 further includes a first main valve 34. The first main valve 34 includes a spool 35 slidably disposed in the bore 19. The spool 35 includes an aluminum head portion, a stainless steel rod press fit in a bore in the head portion, and an aluminum sleeve on the rod for maintaining the proper spacing between two elastomeric valving members. A main inlet port 36 and a cylinder port 37 and an exhaust port 38 open into the bore 19, and the spool 35 controls communication between these ports. The cylinder port 37 is connected to the left end of the cylinder 15 and to the interlock port 30 under all conditions. Air presure in the inlet port 36 acting on the bottom end of the spool 35 urges the spool 35 toward the position shown in the drawing to communicate the cylinder port 37 to the exhaust port 38. A signal chamber 39 at the top end of the spool 35 is in communication with the signal port 29 under all conditions, so that pressure in the signal port 29 can be communicated to the signal chamber 39 to move the spool 35 downwardly as viewed in the drawing. In this downward position, the spool 35 isolates the cylinder port 37 from the exhaust port 38 and connects the cylinder port 37 to the main inlet port 36.

The control valve 14 also includes a second main valve 44. The second main valve 44 includes a spool 45 slidably disposed in the bore 20. The spool 45 includes an aluminum head portion, a stainless steel rod press fit in a bore in the head portion, and an elastomeric valving member. The inlet port 36 and the exhaust port 38, together with a second cylinder port 47, open into the bore 20, and the spool 45 controls communicating between these ports. The cylinder port 47 is in communication with the right end of the cylinder 15 under all conditions. The spool 45 is normally biased to the position shown in the drawing by air pressure in the inlet port 36 to open communication between the inlet port 36 and the cylinder port 47. The top end of the spool 45 communicates with a signal chamber 49, and the signal chamber 49 is connected to the signal port 29. When a pressure signal is communicated to the signal chamber 49, the spool 45 moves downwardly as viewed in the drawing to isolate the inlet port 36 from the cylinder port 47 and to establish communication between the exhaust port 38 and the cylinder port 47.

In operation of the circuit shown in the drawing, the transmission probe 16, in a well-known manner, is extended to the position shown in the drawing whenever the transmission is not in the neutral position. The extended transmission probe 16 engages the pilot spool 27 and moves the spool 27 to the position shown in the drawing. This position of the spool 27 may be called an "interlock position", because the spool 27 in this position locks the piston of the cylinder 15 against movement. This is accomplished by the spool 27 closing communication between the pilot inlet port 28 and the signal port 29 and opening communication between the interlock port 30 and the signal port 29. Thus, if the main valve spools 35 and 45 and the cylinder 15 are in the positions shown in the drawing and the selector valve 12 is moved to communicate the source of air pressure 11 with the pilot inlet port 28, the air pressure in the pilot inlet port 28 will not be communicated to the signal port 29 so that the main valve spools 35 and 45 will remain in their upper positions. Similary, if the signal chambers 39 and 40 are subject to air pressure so that the main valve spools 35 and 45 are in their lower positions and the cylinder 15 is in its rightward position, the pilot interlock valve 26 communicates pressure from the inlet port 36 through the cylinder port 37 and interlock port 30 to the signal chambers 39 and 49 to lock the spools 35 and 45 in such lower positions.

When the transmission of the truck is in the neutral position, the transmission probe 16 is retracted in a well-known manner. In this retracted position, the transmission probe 16 does not interfere with movement of the pilot spool 27. When the selector valve 12 is moved to a position connecting the source of fluid pressure 11 to the pilot inlet port 28, this pressure acting on the differential area of the pilot spool 27 will move the pilot spool 27 upwardly as viewed in the drawing to the top of the bore 18. This position of the spool 27 may be called an "actuating position," because the control valve 14 is operable to actuate the cylinder 15 when the spool is in this position. This is accomplished by the spool 27 establishing communication between the inlet port 28 and the signal port 29 and blocking communication between the interlock port 30 and the signal port 29. The pressure in the inlet port 28 is then communicated to the signal port 29 and signal chambers 39 and 49 to move the main valve spools 35 and 45 downwardly. This reverses the connections on the cylinder 15 and causes the piston of the cylinder 15 to move to its rightward position to change the transmission from one range to another. With the pilot poppet 27 in this actuating position, returning the selector valve 12 to the position shown in the drawing will cause the connections to the cylinder 15 to be reversed again so that the piston of the cylinder 15 will move back to the left. This is because such movement of the selector valve 12 will relieve the pressure in the signal chambers 39 and 49 and will permit the pressure in the main inlet port 36 to move the main spools 35 and 45 upwardly as viewed in the drawing.

What is claimed is:

1. A control valve comprising a main valve and a pilot interlock valve; said main valve including a main inlet port, an exhaust port, a cylinder port, main valve means opening and closing communication between said cylinder port and said main inlet and exhaust ports, said main valve means including a signal chamber and a main spool having an area exposed to pressure in said signal chamber; said pilot interlock valve including a pilot inlet port, an interlock port communicating with said cylinder port, a signal port communicating with said signal chamber, pilot valve means controlling communication between said signal port and said pilot inlet and interlock ports, said pilot valve means including a pilot spool movable between an interlock position and an actuating position, and said pilot valve means closing communication between said pilot inlet port and said signal port and opening communication between said interlock port and said signal port when said pilot spool is in said in said interlock position.

2. A control valve as set forth in claim 1, wherein said pilot valve means opens communication between said pilot inlet port and said signal port and closes communication between said interlock port and said signal port when said pilot spool is in said actuating position.

3. A control valve as set forth in claim 1, wherein said pilot valve means includes a spring biased valve seat, a first valve surface cooperating with said seat to open and close communication between said pilot inlet port and said signal port, and a second valve surface cooperating with said valve seat to open and close communication between said interlock port and said signal port.

4. A control valve as set forth in claim 1, including mechanical actuator means for holding said pilot spool in said interlock position under predetermined conditions.

5. A control valve as set forth in claim 1, wherein said pilot spool includes a net lateral cross sectional area exposed to inlet port pressure for moving said spool from said interlock position to said actuating position.

6. A control valve comprising a main valve and a pilot interlock valve; said main valve including a main inlet port, a cylinder port, main valve means opening and closing communication between said cylinder port and said main inlet port, said main valve means including a signal chamber and a main spool responsive to pressure in said signal chamber; said pilot interlock valve including a pilot inlet port, an interlock port communicating with said cylinder port, signal port means communicating with said signal chamber, pilot valve means controlling communication between said signal port means and said pilot inlet and interlock ports, said pilot valve means including a pilot spool movable between an interlock position and an actuating position, said pilot valve means closing communication between said pilot inlet port and said signal port means and opening communication between said interlock port and said signal port means when said pilot spool is in said interlock position, and said pilot valve means opening communication between said pilot inlet port and said signal port means and closing communication between said interlock port and said signal port means when said pilot spool in in said actuating position.

7. A control valve as set forth in claim 6, including mechanical actuator means for holding said pilot spool in said interlock position under predetermined conditions.

8. A control valve as set forth in claim 6, including a second main valve having a second cylinder port, second main valve means opening and closing communication between said second cylinder port and said main inlet port, said second main valve means including a second signal chamber and a second main spool responsive to pressure in said second signal chamber, and said second signal chamber being in communication with said signal port means.

9. A control valve as set forth in claim 6 wherein said main valve means and said pilot valve means are each poppet valves.

10. A control valve comprising a main valve and a pilot interlock valve; said main valve including a main inlet port, an exhaust port, a cylinder port, main valve means opening and closing communication between said cylinder port and said main inlet and exhaust ports, said main valve means including a signal chamber and a main spool having an area exposed to pressure in said signal chamber; said pilot interlock valve including a pilot inlet port, an interlock port, a signal port communicating with said signal chamber, pilot valve means controlling communication between said signal port and said pilot inlet and interlock ports and closing communication between said interlock port and said inlet port under all conditions, said pilot valve means including means establishing communication between said interlock port and said cylinder port under all conditions and a pilot spool movable between an interlock position and an actuating position, said pilot valve means closing communication between said pilot inlet port and said signal port and opening communication between said interlock port and said signal port when said pilot spool is in said interlock position, said pilot valve means including a spring biased valve seat, a first valve surface cooperating with said seat to open and close communication between said pilot inlet port and said signal port, and a second valve surface cooperating with said valve seat to open and close communication between said interlock port and said signal port.

11. A pneumatic circuit comprising a source of air pressure, a selector valve communicating with said source of air pressure, a control valve, a mechanical actuator, and a power cylinder; said control valve including a main valve and a pilot interlock valve; said main valve including a main inlet port communicating with said source of air pressure, an exhaust port, a cylinder port communicating with said power cylinder, main valve means opening and closing communication between said cylinder port and said main inlet and exhaust ports, said main valve means including a signal chamber and a main spool having an area exposed to pressure in said signal chamber; said pilot interlock valve including a pilot inlet port, an interlock port communicating with said cylinder port, a signal port communicating with said signal chamber, pilot valve means controlling communication between said signal port and said pilot inlet and interlock ports, said pilot valve means including a pilot spool movable between an interlock position and an actuating position, said pilot valve means closing communication between said pilot inlet port and said signal port and opening communication between said interlock port and said signal port when said pilot spool is in said interlock position, and said mechanical actuator holding said pilot spool in said interlock position under predetermined conditions.

* * * * *